Patented Apr. 27, 1948

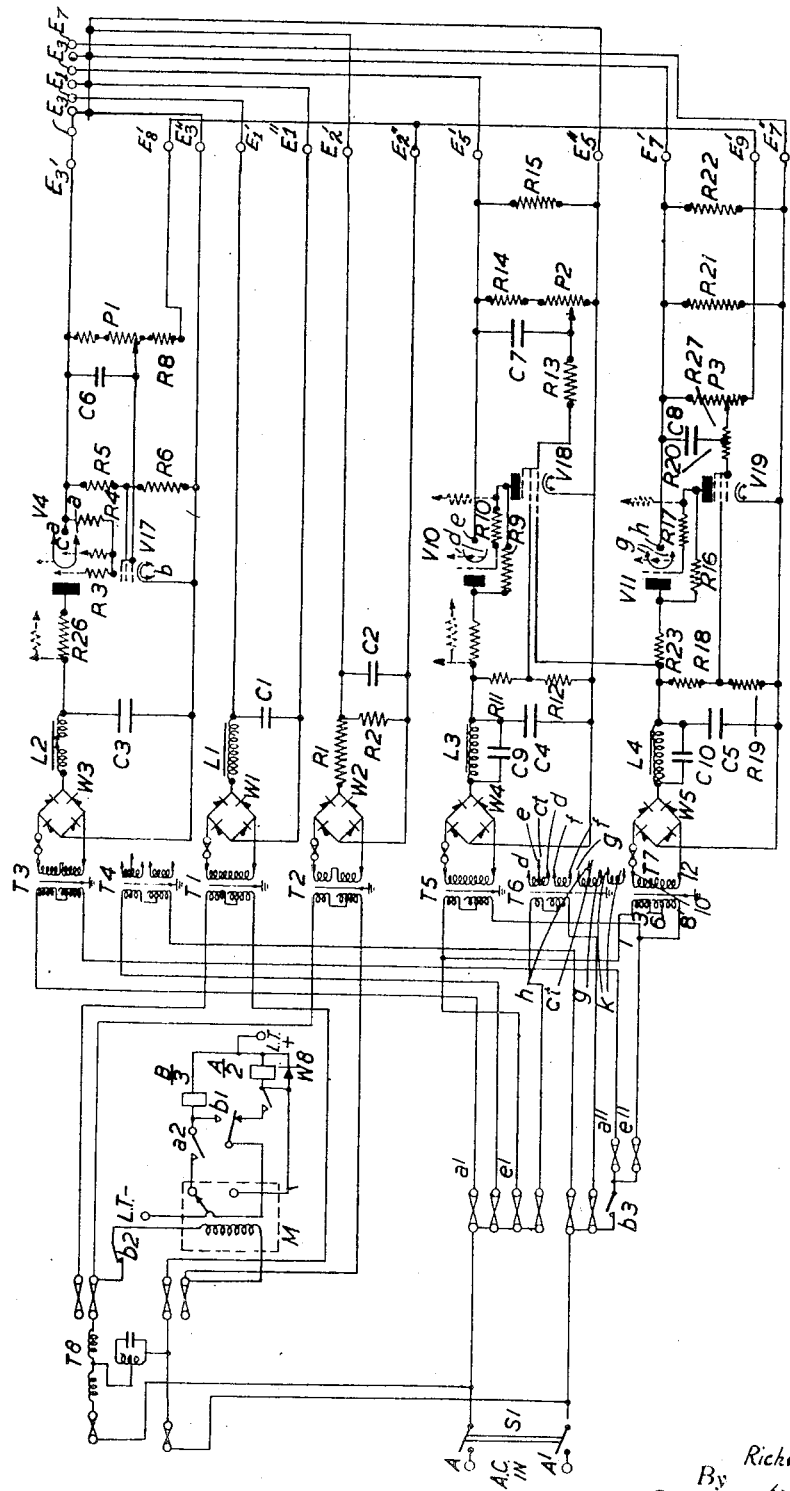

2,440,275

UNITED STATES PATENT OFFICE 2,440,275

POWER SUPPLY SYSTEM FOR CARRIER COMMUNICATION SYSTEMS

Richard Kelly, London, England, assignor to Standard Telephones and Cables Limited, London, England, a British company Application July 12, 1943, Serial No. 494,343
In Great Britain August 7, 1942

2 Claims. (Cl. 175—363)

This invention relates to power supply systems for multi-channel carrier systems and has for its object to provide such a system in which the regulation of the voltage required for the thermionic valves of the system is carried out in an improved manner.

A well known arrangement for the regulation of the voltage of a supply comprises a space discharge regulator device in the form of a three electrode thermionic valve in series with the load circuit, the impedance of the device being controlled to compensate for changes in voltage across the load circuit. For this purpose the grid of this valve is controlled by a potential varying according to that across the load. It has been proposed, in order to avoid the variation of grid bias batteries with time to raise the cathode of this valve to a standard potential with respect to one of the load circuit terminals by means of a potential derived from the potential across a gas-filled tube connected in shunt to the supply. I have found, however, that the potential across a gas-filled tube is unstable and cannot be relied upon for such purpose.

According to the present invention I provide a power supply system for a multi-channel carrier system in which the high tension direct voltage or voltages is or are derived from an alternating current supply through rectifiers and are regulated by applying a potential varying according to the load circuit voltage and a bias potential to the grid of a thermionic valve in opposition, the anode voltage of which valve controls the impedance of a space discharge regulator device in series with the load circuit and in which the said bias potential is obtained from the said alternating current supply after passing through a static regulator of the saturating choke type and through a separate transformer secondary and separate rectifier from that or those supplying the said high tension direct voltage or voltages.

One embodiment of the invention will be described as applied in a power supply system for a multi-channel carrier telegraph system in which the requirements as to voltage regulation are especially severe.

In a multi-channel carrier telegraph system high tension direct voltages are required not only for application to the anodes of the thermionic valves forming the carrier transmitters and receivers but also for the voltages by which the relays of the direct current telegraph channels modulate the carrier currents and for the voltages to be applied to the direct current telegraph channels in accordance with received carrier signals. These direct voltages are plus and minus voltages equally removed from zero and it is preferred to obtain the plus and minus values separately, i. e. through separate transformer secondaries and rectifier bridges, and to regulate each by means of an individual space discharge regulator device the impedance of which is controlled by an individual thermionic valve. The bias potential for the grid of the thermionic valve for the regulation of one of these voltages, e. g. the minus voltage, is obtained directly from the alternating current in the manner above mentioned, but preferably the bias potential for the regulation of the other of these voltages, the plus voltage, is obtained from the regulated output of the minus voltage, in order that, if there is any slight variation the plus and minus voltages shall vary together.

The system shown in the accompanying drawing is the first power supply system for a multi-channel carrier telegraph system of which I am aware in which satisfactory operation has been obtained without the use of batteries. This system has been found to be better than prior systems using batteries.

Referring to the drawing, the alternating current mains are connected to the terminals A, A' and when the switch S1 is closed alternating current is supplied to a plurality of transformer primaries in parallel. The power supply for the cathode heaters of the valves of the carrier telegraph transmitters and receivers is obtained at terminal pair $E_1'$, $E_1''$ from a transformer T1 and rectifier bridge W1, the supply being smoothed by inductance L1 and condenser C1. The anode voltages for the valves in the carrier telegraph transmitters and receivers is supplied to terminal pair $E_3'$, $E_3''$ through transformer T3 and rectifier bridge W3, being regulated in a manner described hereafter. Voltages of +80 volts and —80 volts required for the D. C. telegraph transmitters that modulate the carrier transmitters and for the voltages to be applied to the D. C. channels by the carrier receiving circuits are obtained at terminal pairs $E_5'$, $E_5''$, and $E_7'$, $E_7''$ through transformers T5, T7 and rectifier bridges W4 and W5 respectively and regulated in a manner described hereafter. A bias voltage of 100 volts required for the regulators for the anode voltages and the D. C. telegraph transmitter voltages is obtained at terminal pair $E_2'$, $E_2''$ through transformer T2 and rectifier bridge W2, resistances R1, R2 and condenser C2 being connected beyond the rectifier bridge W2 to 'erminals $E_8'$ and $E_9'$ for a purpose to be explained. After having brought one terminal of each of the above-mentioned thermionic pairs to a common potential, the outgoing terminals are indicated at $E1$, $E3$, $E5$, and $E7$.

The terminals of the primary of transformer T1 and terminals of transformer T2 are connected to the supply terminals A, A' through a regulating transformer T7 of known kind, operating on the saturated choke principle, which provides an output which is stable within narrow limits despite variations in the mains supply, and through switch S1. Terminals $a'$, $a''$ of the primary of transformer T3 and terminals $e'$, $e''$ of the primaries of transformers T5 and T7 are connected through switch S1 to the supply terminals A, A' without the interposition of a regulator but interposed in one lead are normally open contacts $b3$ of a relay $$\frac{B}{3}$$

which forms part of a time delay arrangement hereinafter described.

The supply of $-80$ volts for the D. C. telegraph transmitters is obtained through transformer T7 and rectifier bridge W5 followed by a smoothing filter L4, C10, C5. Condenser C10 and inductances L4 are arranged to be resonant at 100 cycles and thus decrease the voltage across C5 at low loads. The output from this filter is regulated in the following manner. In one of the leads is connected a resistance R23 and a thermionic valve regulator V11 in series. Although only one valve is shown it is to be understood that a plurality of valves in parallel the number depending upon the load may be used e. g., for a current of 0.55 ampere, six valves are connected in parallel, and there are six resistances R23. The grid of valve V11 is connected through resistance R17 to the anode of valve V19 (there are as many resistances R17 as there are valves V11) the cathode of which is connected to the other lead from bridge W5. Valve V19 is shown as a pentode with the suppressor grid connected to the control grid, and the screen grid biassed by a potentiometer R18, R19 across the smoothed output of rectifier bridge W5. The control grid is connected through resistances R20, R27 to a point on a potentiometer P3 which is connected between the positive side of the load and the negative side of the rectified and smoothed supply from transformer T2 and rectifier bridge W2.

Any decrease in load current or increase in mains voltage causes an increase in voltage across the smoothing condenser C5 which tends to cause the load voltage to increase. The grid of valve V19 will tend to become more positive and the anode potential of valve V19 will decrease. The grid bias on V11, which is the difference between the potential of the anode of V19 and the output voltage, increases, and thus the impedance of tube V11 increases to counteract the increase in voltage across C5. Since the standard reference voltage is supplied to the grid of valve V19 instead of to the cathode, as is the more usual arrangement, no resistance is required in the cathode circuit, which resistance when present has an autobias effect, thus adversely effects the operation of the control valves.

Moreover, by applying the reference voltage as a bias on the grid of V19 the supply from transformer T2 becomes a high voltage low current supply which is more easily smoothed by the resistance capacity filter R1R2, C2 than the low voltage higher current supply that would be needed if a fixed potential were applied to the cathode of V19.

Fluctuations between full load and no-load which occur in the D. C. telegraph circuits are reduced in effect by the provision of a resistance R22 of 8,000 ohms as a dummy load.

For simplicity and economy the heater voltages of the valves V11 and V19 are not regulated. The cathode of the valve V11 is a directly heated filament supplied from terminals $g$, $g$. of the secondary of transformer T6. The cathode of valve V19 is indirectly heated, the heater being connected to terminals $k$, $k$ on the secondary of the transformer T6. The electron emission from the cathodes of these valves changes with variation in the mains supply and to compensate for this a slight increase in the negative bias voltage with increase in the voltage of the mains supply is desirable and is most easily accomplished when, as in the arrangement shown, the reference voltage is applied as a bias to the grid.

Since valve V11 becomes conducting immediately potential is applied to its anode and current to its filament, whilst V19 requires an interval, whilst the cathode is heating up to become conducting, precautions are taken to prevent the supply being connected to the primary of transformer T7 until the cathode of valve V19 has had time to heat up. Otherwise the voltage supplied to the load might fluctuate considerably in the absence of control by valve V19. For this purpose, closure of the switch S1 connects the A. C. supply immediately to terminals $f'f''$ of the primary of transformer T6, but the connection of A. C. to terminals $e'e''$ of transformer T5 is delayed because contacts $b3$ of relay $$\frac{B}{3}$$

are initially open. A synchronous motor M is set in operation over normally closed contacts $b2$ of the relay $$\frac{B}{3}$$

Attached to the rotor of the motor is a revolving arm which makes momentary contact with two studs in succession. In the position shown nothing happens but when the arm comes on to the next stud, relay $$\frac{A}{2}$$

operates, and closes contact $a2$ and a locking circuit for itself over contacts $a1$ front and $b1$ back. When the arm again reaches the position shown, relay $$\frac{B}{3}$$

operates, closed a locking circuit for itself over contacts $b1$, breaks the circuit of relay $$\frac{A}{2}$$

at the same contacts, and for the motor M at contacts $b2$, and at front contacts $b3$ connects the A. C. to the terminals $e'e''$ of transformer T7. The rectifier W8 allows relay $$\frac{A}{2}$$

to remain operated until relay B has time to close its locking circuit.

The current for the operation of relays $$\frac{A}{2} \text{ and } \frac{B}{2}$$

is obtained from the smoothed output of transformer T1 and rectifier bridge W1. Thus if a mains failure occurs, relay $$\frac{B}{3}$$

releases, opens contacts b3 and closes contacts b2. When the mains supply is restored a delay in the connection of voltage to transformer T7 occurs in the same manner as described. This delay is arranged to be 50 seconds.

In a telegraph supply it is necessary to maintain the difference between the positive and negative sides of the D. C. circuits within very close limits, and although the actual voltage should be kept approximately to the nominal the allowable deviation is greater the more closely the + and − sides of the D. C. circuits are balanced. In the arrangement shown the bias on the grid of the valve V18 which regulates the supply for the positive side of the D. C. circuits is biassed from a potentiometer R14, P2, R21 connected across the outputs of the positive and negative D. C. supplies in series. Any change in the load to the negative circuit will be reflected to the regulator of the positive load and a balance of voltages results.

The voltage of +80 required for the D. C. telegraph transmitters is derived from the transformer T5 and rectifier bridge W4, is smoothed by inductances L3 and condenser C9 and C4 (arranged in the same manner as inductances L4 and condensers C10 and C5) and is regulated in the manner above described by valve V10 controlled by a valve V18. The bias voltage for the grid of valve V18 is derived from potentiometer P2 which is in series with resistances R14 and R21 between the positive terminal of the +80 v. and the negative terminal of the −80 v. load circuits. A dummy load R15 is used in the same manner as R22.

The voltage required for the anodes of the valves in the carrier telegraph system is obtained from a transformer T3 and rectifier bridge W3, smoothed by an inductance L2 and condenser C3 and regulated by a valve V4, which is controlled by a valve V17. The grid bias of valve V17 is obtained in the same manner as that for valve V19, the grid being connected to a point on a potentiometer P1 between the positive side of the load and the −100 v. obtained from transformer T2 and rectifier bridge W2.

It should be observed that valves V4 and V10 are in practice, each a plurality of valves connected in parallel.

As pointed out above the bias potential for the valves V17, V18 and V19 is subjected only to the regulation of the static transformer T8 and smoothing circuit R1, R2, C2, whilst the supply for cathode heaters of these valves is not subject to such regulation. An increase in mains voltage causes increases in the voltage across the heaters of the cathodes of valves V17, V18 and V19, this causes an increase in the potential drop across resistances R3, R10 and R17 and thus an increase in the bias applied to valves V4, V10 and V11. A decrease in output voltage results. The bias potential applied to the grids of valves V17, V18 and V19 also increases with increase in mains voltage. This increase in bias potential serves to compensate for the increased emission from the cathodes.

The supplies for the various voltages required have been shown as derived through separate transformers but this is merely a matter of convenience and transformers T1 and T2 on the one hand and T4, T5, T6 and T7 on the other hand may have a common primary and separate secondary windings.

What is claimed is:

1. In a power supply system for a multi-channel carrier system in which each high tension direct current voltage controlling a load circuit is derived from an alternating current supply through a transformer and rectifier, regulation being obtained by controlling the potentials of a thermionic valve having a plurality of grids, the anode voltage of which controls the impedance of a space discharge regulator device connected in series with the load circuit, the combination therewith comprising means for deriving a bias reference potential, said means further comprising a separate transformer having a primary connected to said alternating current supply and a secondary, a static regulator of the saturable choke type connected in said primary, a rectifier connected in said secondary, means for deriving a potential in opposition to said reference potential, said opposition potential varying according to the potential across the load circuit, and means for applying said reference potential and said opposition potential to the input of said thermionic valve.

2. A power supply system in accordance with claim 1, further comprising means for supplying cathode potentials to said thermionic valve and means responsive to said separate transformer energization for delaying the energization of said space discharge regulator device with respect to said cathode supply potentials.

RICHARD KELLY.

REFERENCES CITED

The following references are of record in the file of this patent:

UNITED STATES PATENTS

| Number | Name | Date |
|---|---|---|
| 2,113,220 | Power | Apr. 5, 1938 |
| 2,117,138 | Bock | May 10, 1938 |
| 2,117,908 | O'Kawa et al. | May 17, 1938 |
| 2,120,884 | Brown | June 14, 1938 |
| 2,195,121 | Moyer | Mar. 26, 1940 |
| 2,217,473 | Exner | Oct. 8, 1940 |
| 2,247,082 | Gardiner | June 24, 1941 |
| 2,268,790 | White et al. | Jan. 6, 1942 |
| 2,274,365 | Gardiner | Feb. 24, 1941 |
| 2,299,942 | Trevor | Oct. 27, 1942 |
| 2,316,577 | Ford et al. | Apr. 13, 1943 |
| 2,377,500 | Johnson | June 5, 1945 |